US 8,847,734 B2

(12) United States Patent
Ronkainen

(10) Patent No.: US 8,847,734 B2
(45) Date of Patent: Sep. 30, 2014

(54) METHOD OF GIVING THE USER INFORMATION, PORTABLE DEVICE, AND COMPUTER PROGRAM PRODUCT

(75) Inventor: Sami Ronkainen, Oulu (FI)

(73) Assignee: Mobilemedia Ideas LLC, Chevy Chase, MD (US)

( * ) Notice: Subject to any disclaimer, the term of this patent is extended or adjusted under 35 U.S.C. 154(b) by 459 days.

(21) Appl. No.: 11/024,280

(22) Filed: Dec. 28, 2004

(65) Prior Publication Data
US 2005/0110611 A1   May 26, 2005

Related U.S. Application Data

(63) Continuation of application No. 09/717,862, filed on Nov. 21, 2000, now Pat. No. 6,850,150.

(30) Foreign Application Priority Data

Nov. 26, 1999 (FI) ...................................... 19992535

(51) Int. Cl.
*H04M 3/22* (2006.01)
*H04M 1/725* (2006.01)
*H04M 19/04* (2006.01)
*H04W 88/02* (2009.01)

(52) U.S. Cl.
CPC .......... *H04W 88/02* (2013.01); *H04M 1/72569* (2013.01); *H04M 19/04* (2013.01); *H04M 19/047* (2013.01); *H04M 1/72588* (2013.01)
USPC ........................................ 340/7.56; 340/7.6

(58) Field of Classification Search
CPC ........... H04Q 7/00; H04K 1/00; G08B 21/00; H04M 3/22
USPC ................ 340/7.58, 7.6–7.61, 407.1, 825.19, 340/825.44, 7.56; 341/21; 379/52; 455/426, 455/38.4, 140, 517, 575
See application file for complete search history.

(56) References Cited

U.S. PATENT DOCUMENTS

| 5,076,260 A | * | 12/1991 | Komatsu ........................ 601/59 |
| 5,191,611 A | * | 3/1993 | Lang ............................... 705/53 |
| 5,293,161 A | * | 3/1994 | MacDonald et al. .......... 340/7.6 |
| 5,515,285 A | * | 5/1996 | Garrett et al. ................. 701/300 |
| 5,557,671 A | | 9/1996 | Endoh ........................... 379/355 |
| 5,640,441 A | * | 6/1997 | Serrano et al. ............. 379/32.04 |
| 5,696,497 A | | 12/1997 | Mottier et al. ........... 340/825.44 |

(Continued)

FOREIGN PATENT DOCUMENTS

| EP | 0467071 A2 | 1/1992 |
| EP | 0688125 A1 | 12/1995 |

(Continued)

*Primary Examiner* — Nam V Nguyen
(74) *Attorney, Agent, or Firm* — Proskauer

(57) ABSTRACT

There is provided a portable device, comprising: control means for monitoring and controlling the operation of the device; and a user interface which comprises alarm means for performing a silent alarm producing a silent, invisible, tactile sensation in the user; the control means are arranged to give the user abstract information on multiple internal operational events of the device by using various silent alarm patterns of silent, invisible sensations produced by the alarm means and sensed by the user, the alarm patterns differing from one another such that at least one alarm pattern characteristic sensed by the user varies, said abstract information comprising a notification of a specific internal operational event of the device.

12 Claims, 2 Drawing Sheets

(56) References Cited

U.S. PATENT DOCUMENTS

| | | | |
|---|---|---|---|
| 5,719,561 A | 2/1998 | Gonzales | 340/7.51 |
| 5,767,778 A * | 6/1998 | Stone et al. | 340/636.1 |
| 5,864,603 A * | 1/1999 | Haavisto et al. | 379/88.01 |
| 5,896,096 A * | 4/1999 | Kim | 340/7.24 |
| 5,973,612 A * | 10/1999 | Deo et al. | 340/7.58 |
| 6,032,058 A * | 2/2000 | Higuchi et al. | 455/567 |
| 6,094,565 A * | 7/2000 | Alberth et al. | 455/575.3 |
| 6,127,936 A * | 10/2000 | Gendel et al. | 340/692 |
| 6,160,489 A * | 12/2000 | Perry et al. | 340/7.6 |
| 6,240,176 B1 * | 5/2001 | Lygas | 379/374.03 |
| 6,427,078 B1 * | 7/2002 | Wilska et al. | 455/550.1 |
| 6,653,930 B1 * | 11/2003 | Bonomo et al. | 340/7.59 |
| 7,936,251 B1 * | 5/2011 | Hamaguchi et al. | 340/7.6 |

FOREIGN PATENT DOCUMENTS

| | | |
|---|---|---|
| WO | WO 93/15590 | 8/1993 |
| WO | WO 96/00429 | 1/1996 |
| WO | WO 96/26580 | 8/1996 |

* cited by examiner

METHOD OF GIVING THE USER INFORMATION, PORTABLE DEVICE, AND COMPUTER PROGRAM PRODUCT

CROSS-REFERENCE TO RELATED APPLICATIONS

This application is a continuation of and claims priority from U.S. patent application Ser. No. 09/717,862, filed on Nov. 21, 2000 now U.S. Pat. No. 6,850,150.

FIELD

The invention relates to a method of giving the user information on the operation of a device, to a portable device and to a computer program product encoding a computer program of instructions for executing a computer process for method of giving the user information on the operation of the process.

BACKGROUND

EP publication 0 467 071 A2 discloses a subscriber terminal in a telecommunication system. A conventional alarm tone indicating an incoming call can be replaced with vibration the user can sense. A device implementing the vibration can be located in the casing of the subscriber terminal or it can be a separate device that is connected to the subscriber terminal through a wired or a wireless data transmission connection.

Publications WO 93/15590 and U.S. Pat. No. 5,696,497 disclose a radio transceiver that employs both silent and audible alarm. Silent alarm can be implemented by vibration, for instance. The radio transceiver informs the user of an incoming call using the silent alarm and if the user does not answer the call within a predetermined time, the radio transceiver gives an audible alarm using tones. The device implementing the vibration is located in the subscriber terminal. The radio transceiver can also automatically change the alarm mode employed from silent alarm alone to audible alarm when the radio transceiver is connected to an external power supply or a holder. The user can control the duration of the alarm and the periodic alternation of silent and audible alarms.

EP publication 0 688 125 A1 discloses a mobile station employing a vibrating alarm. A device implementing the vibration is located in a module separate from the mobile station, for instance in a battery of the mobile station. Apart from vibration, the silent alarm can be implemented with a light, an electric signal or air, for example.

Computer games employ controllers by which attempts are made to model the game's onscreen virtual reality. For instance, at the Internet address http://www.force-feedback.com there is a description of a force feedback mouse providing a tactile sensation that can be used for controlling a portable computer, for instance. By means of the mouse, it is possible to model the onscreen reality. The mouse provides tactile feedback. For instance, when the cursor clicks an onscreen button, the user feels in the mouse a snap that represents clicking. It is also possible to sense e.g. various surface materials with the mouse. If the computer display shows ice, the mouse simulates a sliding movement especially the speed of movement when the cursor is passing over the ice, as compared with the cursor moving over sand shown on screen. When moving over the sand, the mouse can also shake.

The above describes tactile alarm modes informing of an incoming call and user interfaces attempting to model virtual reality by means of touch. Mobile telephones are also known which inform the user with even vibration that he has selected a closing function, i.e. power switch-off, or an opening function, i.e. power switch-on.

In portable devices, such as mobile telephones, rather limited interest has been shown in the needs of handicapped persons. For instance, very little attention has been paid to the needs of aurally or visually impaired people. Visually impaired persons have had at their disposal programmable shortcut function keys. A person with normal eyesight has in that case programmed a telephone number to be dialed with one key. A problem with this solution is the small number of programmable keys.

An object of the invention is to provide an improved portable device, and improved method of giving the user information on the operation of the device and an improved computer program product encoding a computer program of instructions for executing a computer process for method of giving the user information on the operation of the device. According to an aspect of the invention, there is provided portable device, comprising: control means for monitoring and controlling the operation of the device; and a user interface which comprises alarm means for performing a silent alarm producing a silent, invisible; tactile sensation in the user. The control means are arranged to give the user abstract information on multiple internal operational events of the device by using various silent alarm patterns of silent, invisible sensations produced by the alarm means and sensed by the user, the alarm patterns differing from one another such that at least one alarm pattern characteristic sensed by the user varies, said abstract information comprising a notification of a specific internal operational event of the device.

According to another aspect of the invention, there is provided a portable device, comprising: control means for monitoring and controlling the operation of the device; and a user interlace which comprises alarm means for performing a silent alarm producing a silent, invisible, tactile sensation in the user. The control means are arranged to give the user abstract information on multiple internal operational events of the device by using various silent alarm patterns of silent, invisible sensations produced by the alarm means and sensed by the user, the alarm patterns differing from one another such that at least one alarm pattern characteristic sensed by the user varies, said abstract information comprising a notification of a specific telephone number appearing at the user interface of the device while the user is selecting the desired telephone number prior to starting the call.

According to another aspect of the invention, there is provided a portable device, comprising: control means for monitoring and controlling the operation of the device; and a user interface which comprises alarm means for performing a silent alarm producing a silent, invisible, tactile sensation in the user. The control means are arranged to give the user abstract information on multiple internal operational events of the device by using various silent alarm patterns of silent, invisible sensations produced by the alarm means and sensed by the user, the alarm patterns differing from one another such that at least one alarm pattern characteristic sensed by the user varies, said abstract information comprising an error message to the user about a specific operational event of the device.

According to another aspect of the invention, there is provided a method of giving the user information on the operation of the device, which comprises: detecting an event that concerns the operation of the device and interest the user with the control means of the portable device, if at, least one silent alarm pattern producing silent, invisible, tactile sensation in the user is attached to the event, giving the user abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising a notification of a specific internal operational event of the device.

According to another aspect of the invention, there is provided a method of giving the user information on the operation of the device, which comprises: detecting an event that concerns the operation of the device and interest the user with the control means of the portable device, if at least one silent alarm pattern producing silent, invisible, tactile sensation in the user is attached to the event, giving the user abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising a notification of a specific telephone number appearing at the user interface of the device while the user is selecting the desired telephone number prior to starting the call.

According to another aspect of the invention, there is provided a 15 method of giving the user information on the operation of the device, which comprises: detecting an event that concerns the operation of the device and interest the user with the control means of the portable device, if at least one silent alarm pattern producing silent, invisible, tactile sensation in the user is attached to the event, giving the user abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising an error message to the user about a specific operational event of the device.

According to another aspect of the invention, there is provided a computer program product encoding a computer program of instructions for executing a computer process for method of giving the user information on the operation of the device, the process comprising: detecting an event that concerns the operation of the device and interests the user with the control means of the portable device; if at least one silent alarm pattern producing silent, invisible, tactile sensation in the user is attached to the event, the user is given abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising a notification of a specific internal operational event of the device.

According to another aspect of the invention, there is provided a computer program product encoding a computer program of instructions for executing a computer process for method of giving the user information on the operation of the device, the process comprising: detecting an event that concerns the operation of the device and interests the user with the control means of the portable device; if at least one silent alarm pattern producing silent, invisible, tactile sensation in the user is attached to the event, the user is given abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising a notification of a specific telephone number appearing at the user interface of the device while the user is selecting the desired telephone number prior to starting the call.

According to another aspect of the invention, there is provided a computer program product encoding a computer program of instructions for executing a computer process for method of giving the user information on the operation of the device, the process comprising: detecting an event that concerns the operation of the device and interests the user with the control means of the portable device; if at least one silent alarm pattern producing silent, invisible, tactile sensation in the user is attached to the event, the user is given abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising an error message to the user about a specific operational event of the device.

According to another aspect of the invention, there is provided a computer program product encoding a computer program of instructions for executing a computer process for method of giving the user information on the operation of the device, the process comprising: detecting an event that concerns the operation of the device and interests the user with the control means of the portable device; if at least one silent alarm pattern producing silent, invisible, tactile sensation in the user is attached to the event, the user is given abstract information on multiple internal operational events of the device by using at least one silent alarm pattern, produced by the alarm means and sensed by the user, the various alarm patterns differing from one another such that at least one alarm pattern characteristic sensed by the user varies, said abstract information comprising a notification of a selected item on the menu of the user interface.

The invention is based on the idea that means of portable devices, by which e.g. a silent alarm informing of an incoming call can be given, will be used for giving the user also other abstract information, not modeling reality, by utilizing specific silent alarm patterns the user is able to feel. For instance, vibrating alarms have been widely used for years in mobile telephones. However, nobody has thought of using this feature, which causes extra costs and requires a bigger size, for other purposes than for alarming of an incoming call and informing of the switch-on and switch-off of the mobile telephone, always using the same kind of vibration. Surprisingly, by using different alarm patterns, in addition to the incoming call alarm that normally reiterates the same pattern, complex, abstract information can be conveyed to the user by means of vibration. One idea of the invention is thus a kind of 'coded vibration'. In particular, persons with impaired hearing and/or vision detect clearly changes in vibration properties, because their sense of feeling is more developed than normally. One can think that the invention implements a kind of limited application of Braille system by means of vibration. Naturally, the persons with normal senses can also benefit from the invention, since, for example, a person at-tending a meeting or staying in a noisy environment can get information on the operation of his telephone without having to take it out of the pocket. For in-stance, a very important caller can be identified, and the called party can leave the room and answer the telephone.

LIST OF DRAWINGS

The preferred embodiments of the invention are described here by way of example with reference to the attached drawings, wherein FIG. 1 is a simplified block diagram illustrating an example of the structure of a portable device;

DESCRIPTION OF EMBODIMENTS

Figure 1:
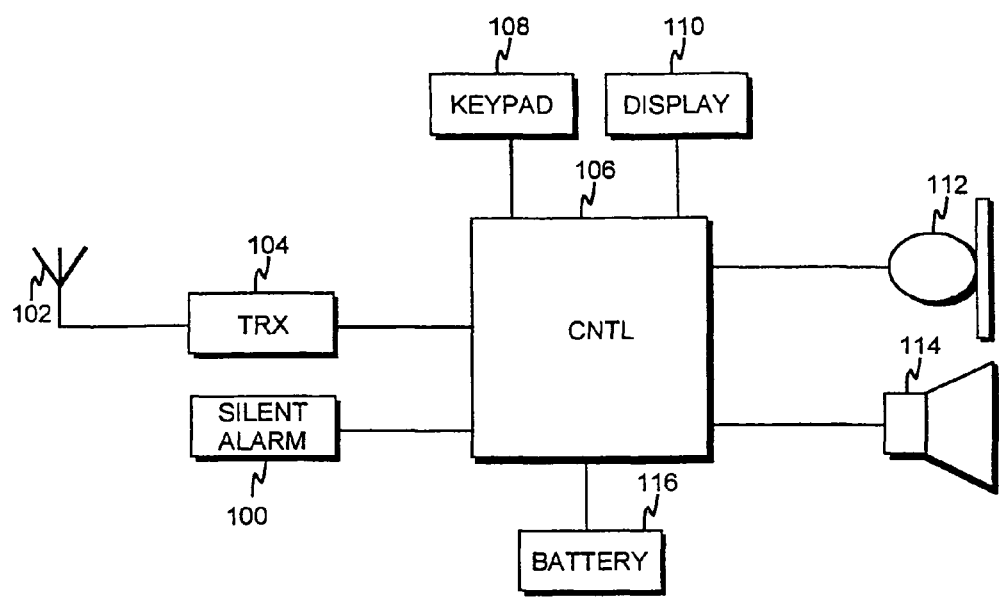

With reference to FIG. 1, an example of the structure of a typical portable device will be described in the following. It concerns a mobile telephone but it is obvious that the invention is not restricted thereto, but also other portable devices, such as various terminals of telecommunication systems, are portable devices in accordance with the invention. One subgroup of these terminals include terminals in mobile systems based on a wireless radio connection, i. e. mobile stations.

A mobile station comprises control means 106 for monitoring and controlling the operation of the device. Typically, the control means are implemented with a microprocessor with software. Other equipment implementations are also possible, for example, an application-specific integrated circuit ASIC. In FIG. 1, the control means 106 control and monitor all parts that are connected with a line to the block representing the control means 106.

The mobile station also includes a user interface. The user interface refers to means by which the user gets information on and controls the operation of the device. In the mobile station, a typical user interface comprises a microphone 112, a loudspeaker 114, a keypad 108 and a display 110. The display 110 can be implemented with liquid crystals, for instance. The mobile station being a videophone, a video camera is also included in the user interface of the mobile station. By means of the keypad 108 the mobile station is controlled to execute a desired operation. The microphone 112 is used for forming speech to be transmitted. The loudspeaker 114 converts the transmitted sound into an audible form. The loudspeaker 114 can also be used for giving an audible alarm, for instance by ringing a tone for informing a called party of an incoming call.

Some mobile stations also have alarm means 100 for giving a silent alarm of an incoming call. In this context, silent refers to an alarm that is primarily intended to be perceptible to other senses than hearing. For instance, vibrating alarm can produce some kind of a sound, however, it is not intended to be heard with ears but the vibration, in particular, is intended to produce a tactile sensation in the user. The publications set forth at the beginning of the present application are incorporated herein as reference. The alarm means can be implemented in any manner known to a person skilled in the art, for instance, in the manners described in said publications. The only substantial thing is that the alarm means 100 are arranged to produce events that are perceptible to the user's sense of feeling.

The alarm means 100 are located in the device itself or in the battery 116 of the device or in a separate part attachable to the device or in a separate part having a data transmission connection to the device, for instance in a wristband the user wears round his wrist.

The alarm means 100 are arranged to produce events that cause a tactile sensation in the user. Typically, the alarm means are a vibrating alarm, but other expressions are also possible, as examples can be given other events that cause tactile sensations in the user, such as an electric signal or a current of air. The vibrating alarm can be implemented by an eccentric electric motor or in a manner described in FIG. 1 of the publication EP 0 467 071 A2.

The mobile station comprises an antenna 102 for receiving a signal from the radio path and for sending a signal onto a radio path. The generation of the transmitted signal and the handling of the received signal are performed in a transceiver 104.

An accumulator 116 supplies power to the mobile station. Instead of the accumulator, batteries can also be used. For instance, in a house, external mains power, or in a vehicle, power from the car battery can be used.

The control means 106 are arranged to give the user abstract information on the operation of the device by using various silent alarm patterns implemented with the alarm means 100. As stated above, the control means 106 may be implement by a microprocessor or similar computer readable medium, encoded with a computer program. The operation of the device is most preferably implemented as changes in software modules which monitor and control the operation of the device. Thus the alarm means 100 communicate with the control means 106, and the operation of the alarm means 100 can be controlled, for instance, by adjusting the power or voltage supplied to the alarm means 100 through the control means 106. The control can also be implemented such that the control means 106 transmit specific control signals to the alarm means 100.

Figure 2:
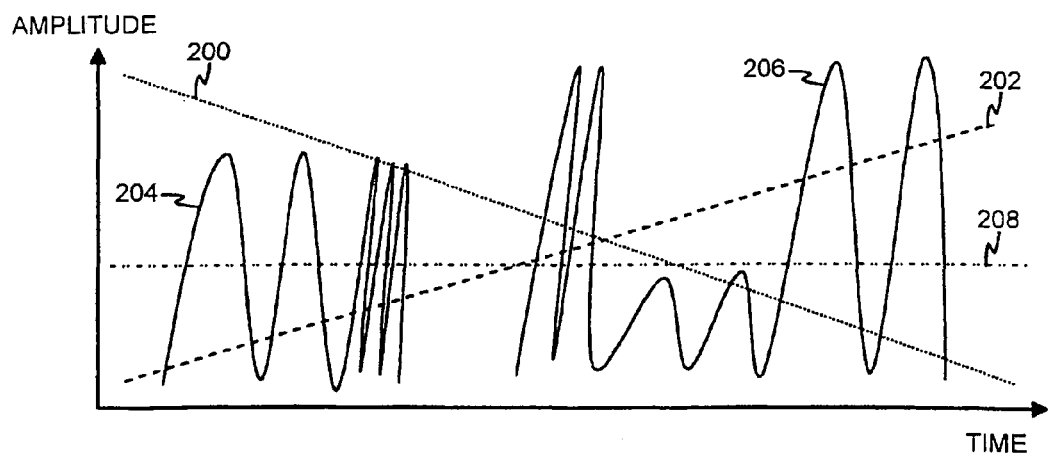
FIG. 2 illustrates various alarm patterns in a coordinate system where the x-axis represents time and the y-axis represents amplitude.

FIG. 2 illustrates various silent alarm patterns in a coordinate system where the x-axis represents time and the y-axis represents amplitude. The line 208 depicts a prior art alarm informing the called party of an incoming call. As appears from FIG. 2, the alarm pattern has the same amplitude for a given time. For clarity, the line 208 does not show variation in frequency.

Various alarm patterns produced by the alarm means 100 differ from one another in such a way that at least one alarm pattern characteristic sensed by the user varies. During one alarm pattern, more than one sensible alarm pattern characteristics may vary.

The line 204 depicts an alarm pattern in which the variable characteristic is the frequency of the alarm pattern. As can be noted from the line 204, first the frequency is lower, and then at the end the frequency becomes higher.

The line 206 depicts an alarm pattern in which the variable characteristic is the amplitude of the alarm pattern. At the beginning of the line 206, the amplitude is relatively great, in the middle of the line 206 the amplitude becomes lower and at the end of the line 206 it resumes the level it had at the beginning of the alarm pattern. The alarm pattern of the line 206 also has another variable characteristic, i.e. the frequency: approximately during the first sixth, the frequency is higher, then the frequency becomes lower.

One more variable characteristic can be the changing rate of the alarm pattern amplitude. The line 200 illustrates a case where the alarm pattern amplitude decreases evenly towards the end temporally. Correspondingly, the line 202 illustrates an alarm pattern whose amplitude increases evenly towards the end. For clarity, variation in frequency has not been described in the lines 200 and 202. The changing rate of the alarm pattern frequency can also vary.

One changing characteristic can also be the duration of the alarm pattern. For example, the alarm patterns indicated by the lines 204 and 206 are of different duration.

The abstract information given to the user can symbolize an event of the device, or the alarm pattern could also provide character-based messages, whereby one alarm pattern would correspond to a character, such as a letter of the alphabet or a numeral. In principle, the alarm patterns can thus form a character string. Character coding can be based on Morse-type coding, for instance, or some other coding which employs frequency and/or amplitude in addition to duration.

The abstract information symbolizing the events of the device comprises error messages to the user. One of these error messages is a notification of a battery running down. This could be implemented, for instance, as vibration having a high frequency at the beginning and becoming evenly lower in order to stop completely after a predetermined period of time.

Another example of error messages is a notification that the portable device has no connection to a base station. This is important information e.g. to a blind person, because (s)he is not able to see the field intensity symbols on the display of the mobile station. A person with normal vision would also benefit from this function, because on sensing a given alarm pattern (s)he could notice without looking at the telephone that (s)he has moved over to an area wherefrom there is no connection to the base station. Correspondingly, when a radio connection is re-established to the base station, information thereon could be given to the user with a given vibration pattern.

The abstract information also comprises feedback for the user on the successful PIN (Personal Identification Number) code enquiry. If the user enters a wrong PIN code, the telephone vibrates in a particular manner, and correspondingly, the correct PIN code produces different feedback.

The abstract information comprises such a silent incoming-call alarm wherein different alarm patterns indicate different callers and/or caller groups. Thus the user attaches specific alarm patterns to desired telephone numbers. The alarm patterns can be a group of predetermined different alarm patterns or the user himself can modify the desired alarm pattern by means of the user interface, e.g. the keypad 108 and the display 110. If the alarm patterns comprise the alphabet, the user can enter a desired text, for instance 'MOTHER', with the keypad into the mobile station which then converts the characters into an alarm pattern corresponding to each character and stores the alarm pattern in the memory. The control means 100 are arranged to receive alarm pattern programming performed by the user utilizing the user interface.

The abstract information also comprises a notification of a specific telephone number appearing at the user interface of the device, for instance on the display 110, while the user of the device is dialing the desired telephone number prior to starting the call. Currently, the telephone numbers are arranged in the mobile station to form a scrollable list on the display 110. When a given telephone number is on the list at a point where it can be selected, the telephone provides a specific alarm pattern. Thus a blind person, for instance, can readily select a person to whom to call. Naturally, the blind person's telephone must be programmed in advance, for instance with the assistance of a person having a normal vision. Preferably, the same telephone number is always indicated with the same alarm pattern, both in the case of an incoming call and a user-originating call.

The abstract information comprises a notification of a selected item on the menu of the user interface. In the mobile station user interface, various functions are arranged into complex menus which can comprise tens or hundreds of different items. It can be difficult for a blind person to remember all these items. In a manner corresponding to what was described above concerning the scrollable list, specific items of the menu could be marked with alarm patterns. On feeling a specific alarm pattern the blind person knows which item of the menu is shown on the display 110.

The above-described examples of the abstract information to be conveyed to the user on the operation of the portable device are only a minor part of all potential information that could be conveyed to the user by means of the invention.

The described user interface is mainly intended for users with impaired hearing and/or vision but it is also well suited for the use of people with normal senses. The use of alarm patterns can be implemented as a function that can be switched on and off by means of the user interface.

Figure 3:
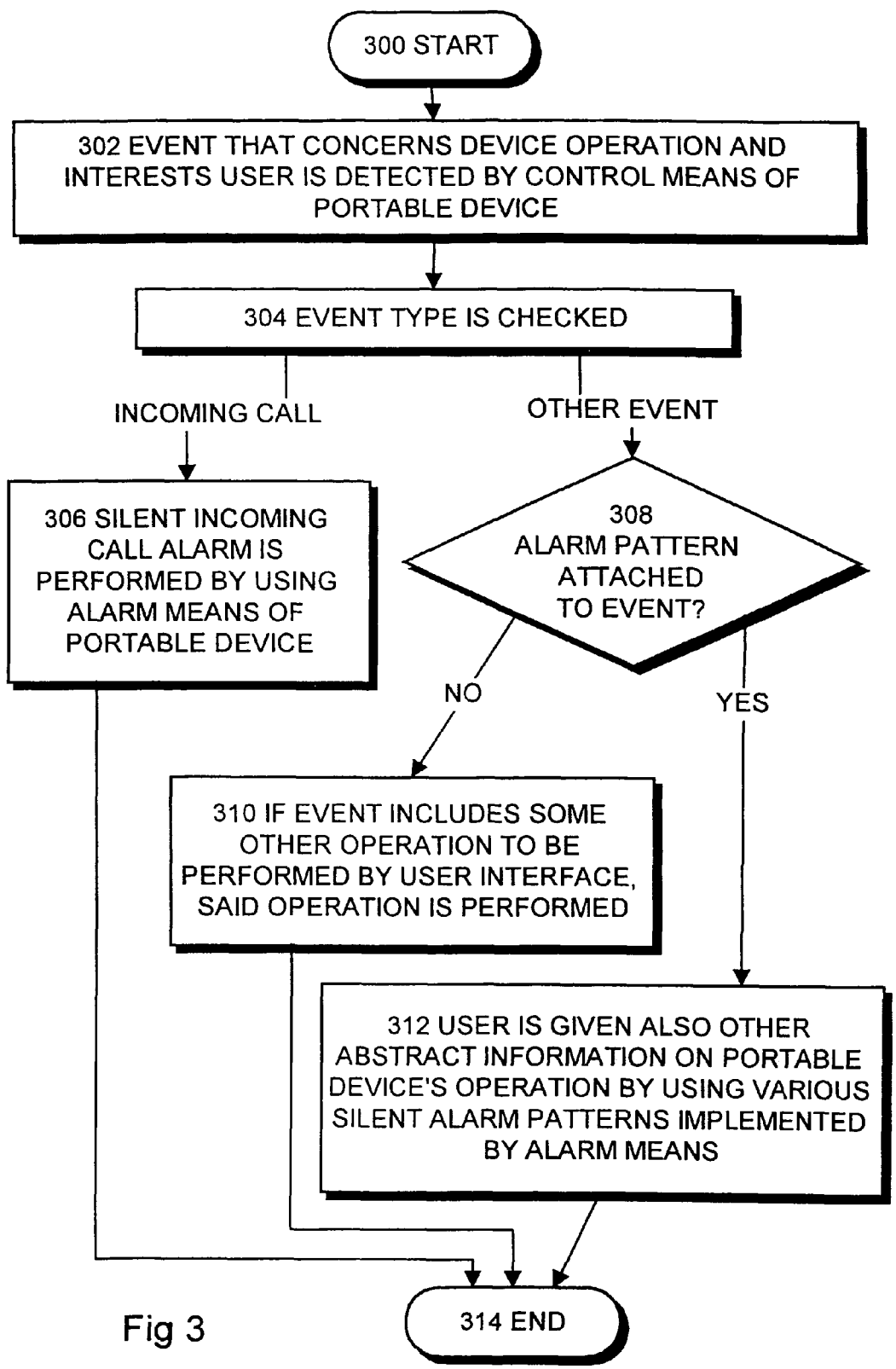
FIG. 3 is a flow chart showing steps of the method in accordance with one embodiment of the invention.

FIG. 3 illustrates a method of giving the user information on the operation of the portable device. The performance of the method starts from block 300. In block 302, an event that interests the user and concerns the operation of the device is detected with the control means 106 of the portable device.

Next, in block 304, the type of the event is checked. If the event is an incoming call, a transfer is performed to block 306, where a silent alarm of the incoming call is given by using the alarm means 100 of the portable device.

If some other event is concerned, a transfer is performed to block 308, where it is checked whether an alarm pattern is attached to the event. If no alarm pattern is attached to the event, a transfer is performed to block 310, where it is further checked whether some other operation to be performed by the user interface is attached to the event, if yes, said operation will be performed.

If it is detected in block 308 that a silent alarm pattern is attached to the event, a transfer is performed to block 312, where other abstract information is also given to the user on the operation of the portable device by using different, silent alarm patterns implemented with the alarm means 100.

Blocks 304 and 306 are optional, and they are not necessary in a portable device that is not operating as a telephone. Likewise, block 310 can be optional.

Various embodiments of the method are described in the dependent method claims, the substantial contents of which are already described in the above. Therefore the description will not be repeated herein. The method can be advantageously modified by means of the described characteristics. In the embodiment where different alarm patterns indicate different callers and/or caller groups when using silent alarm informing of the incoming call, it should be noted that, in FIG. 3, a transfer is then performed from block 306 to block 308. It is also obvious that in given situations it is possible to perform a transfer from block 306 to block 310, for instance, if it is desired that the number of the incoming call shows on the display 110. Likewise in given situations it is possible to transfer from block 312 to block 310, if it is desired that the user receives also other information, apart from the silent alarm pattern, through the user interface, e.g. the display 110.

Even though the invention is described above with reference to the example of the attached drawings, it is obvious that the invention is not restricted thereto but it can be modified in a variety of ways within the inventive idea disclosed in the accompanying claims.

The invention claimed is:

1. A mobile station comprising:
   a user interface configured to enable a user to control operation of the mobile station by manual input and to obtain information on the operation of the mobile station,
   a tactile alert device configured to generate a tactile vibration, and
   a control circuit configured to control the tactile alert device to generate a first tactile vibration with a first pattern in response to a first event and a second tactile vibration with a second pattern that is distinctly humanly perceptibly different from the first pattern in response to a second event different from the first event, wherein one of the events is user entry of an incorrect personal identification number code.

2. The mobile station of claim 1 wherein the mobile station is a mobile telephone.

3. The mobile station of claim 1 further comprising:
   a transceiver for generating a transmitted signal and handling a received signal, and
   an antenna coupled to the transceiver for receiving a wireless signal and for transmitting a wireless signal.

4. The mobile station of claim 1 further comprising a battery for supplying power to the mobile station.

5. The mobile station of claim 1 wherein the user interface further comprises:
   a flat panel display,
   a microphone configured to receive speech to be transmitted,
   a loudspeaker configured to generate sounds,
   a camera, and
   a circuit configured to receive manual input of a user for manually controlling the operation of the mobile station.

6. The mobile station of claim 1 wherein the control circuit further comprises:
   a microprocessor, and
   software executed by the microprocessor.

7. The mobile station of claim 1 where the control circuit is configured to monitor and control operation of the mobile station, to monitor and control the operation of the user interface and to control the operation of the tactile alert device.

8. The mobile station of claim 1 wherein one of the patterns generated by the tactile alert device represents one or more Morse-coded characters.

9. The mobile of station of claim 1 further comprising a wristband configured to enable a user to sense the tactile vibrations generated by the tactile alert device in a wrist of the user.

10. The mobile station of claim 1 wherein the user interface is configured to enable a user to modify one or more of the tactile vibration patterns that can be generated by the tactile alert device.

11. The mobile station of claim 10 wherein the user interface is configured to enable a user to attach different tactile vibration patterns to different callers.

12. A mobile station comprising:
   a user interface configured to enable a user to control operation of the mobile station by manual input and to obtain information on the operation of the mobile station,
   a tactile alert device configured to generate a tactile vibration, and
   a control circuit configured to control the tactile alert device to generate a first tactile vibration with a first pattern in response to a first event and a second tactile vibration with a second pattern that is distinctly humanly perceptibly different from the first pattern in response to a second event different from the first event,
   wherein one of the patterns generated by the tactile alert device represents one or more Morse-coded characters.

* * * * *